United States Patent
Tanaka et al.

(10) Patent No.: US 6,940,569 B2
(45) Date of Patent: Sep. 6, 2005

(54) INFORMATION PROCESSING APPARATUS

(75) Inventors: Akitsugu Tanaka, Tokyo (JP); Masao Nakagawa, Tokyo (JP); Makoto Tanahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/766,281

(22) Filed: Jan. 27, 2004

(65) Prior Publication Data

US 2004/0227867 A1 Nov. 18, 2004

Related U.S. Application Data

(62) Division of application No. 10/304,845, filed on Nov. 26, 2002, now Pat. No. 6,771,333.

(30) Foreign Application Priority Data

Nov. 27, 2001 (JP) .......................................... 2001-360369

(51) Int. Cl.[7] ................................................. G02F 1/13
(52) U.S. Cl. ............................. 349/58; 349/65; 362/85
(58) Field of Search .............................. 349/58, 63, 65; 362/85

(56) References Cited

U.S. PATENT DOCUMENTS 6,191,939 B1 * 2/2001 Burnett ....................... 361/681
6,776,497 B1 * 8/2004 Huppi et al. .................. 362/85

* cited by examiner

Primary Examiner—James A. Dudek
(74) Attorney, Agent, or Firm—Frommer Lawrence & Haug LLP; William S. Frommer

(57) ABSTRACT

An information processing apparatus includes a display unit having a first reflective plate and a second reflective plate forming a reflective-plate unit, and a third reflective plate. The first reflective plate is bonded to an external frame, and the second reflective plate is connected to a reflective-plate hinge. In addition, the third reflective plate is pivotally connected-to the reflective-plate hinge, and a diffusion plate is bonded to the third reflective plate. Light emitted from a cold-cathode fluorescent lamp is guided by an optical waveguide and illuminates the entire surface of a liquid crystal panel. In addition, a part of the light is reflected by the second reflective plate, is incident on the diffusion plate bonded to the third reflective plate, is efficiently diffused by the diffusion plate, and uniformly illuminates an operation unit such as a keyboard.

4 Claims, 15 Drawing Sheets

INFORMATION PROCESSING APPARATUS

This is a division of U.S. application Ser. No. 10/304,845, filed Nov. 26, 2002, now U.S. Pat. No. 6,771,333.

BACKGROUND OF THE INVENTION

1. Field of the Invention

The present invention relates to information processing apparatuses, and more specifically relates to an information processing apparatus in which an operation unit is illuminated by using a part of backlight for illuminating, for example, a liquid crystal display device.

2. Description of the Related Art

FIGS. 1 and 2 show the construction of a known notebook personal computer (hereinafter referred to simply as a notebook PC) 1. FIG. 1 a diagram showing the external view of the notebook PC 1, and FIG. 2 is an enlarged sectional view of a part of the notebook PC 1.

The notebook PC 1 includes a flat, plate-shaped main body 11 which contains a motherboard, a hard disk drive, etc., and a thin display unit 12 which is constructed of a liquid crystal display (LCD) or the like and which is pivotally attached to the main body 11 with a hinge 13.

The display unit 12 is constructed of a liquid crystal panel 15, an external frame 16, and a backlight unit 20 which includes a cold-cathode fluorescent lamp 21, an optical waveguide 22, a diffusion sheet 23, and a reflector 24. Although not shown in the figure, the backlight unit 20 also includes a lens sheet, a reflective sheet, etc.

Light emitted from the cold-cathode fluorescent lamp 21 of the backlight unit 20 is guided upward through the optical waveguide 22, and is diffused by the diffusion sheet 23 such that the entire surface of the liquid crystal panel 15 is illuminated. In order to efficiently guide the light emitted from the cold-cathode fluorescent lamp 21 upward, the reflector 24 is disposed around cold-cathode fluorescent lamp 21 so as to cover the sides and the bottom of the cold-cathode fluorescent lamp 21.

Since the liquid crystal panel 15 is not a self-luminous device, it needs to be uniformly illuminated by the backlight unit 20 from the back.

When a user 2 uses the notebook PC 1, he or she rotates the display unit 12 away from the main body 11, so that an operation unit such as a keyboard 14 formed on the top surface of the main body 11 can be operated and the display unit 12 can be viewed. The liquid crystal panel 15 of the display unit 12 is illuminated by the backlight unit 20, and displays characters, figures, etc.

When light is emitted from the liquid crystal panel 15 of the display unit 12, that is, when light is emitted from the backlight unit 20 through the liquid crystal panel 15, the light is emitted in an approximately horizontal direction in the figure so that it is effectively guided toward the user 2.

Since the light emitted from the liquid crystal panel 15 is guided mainly toward the user 2 as described above, the user 2 can easily view the liquid crystal panel 15 which is illuminated brightly. However, when the user 2 uses the notebook PC 1 in a dark environment (for example, in a room where lights are turned off at night, in a conference room where a projector is being used, in an aircraft flying at night, etc.), the operation unit such as the keyboard 14 is placed in a dark region, as shown in FIG. 1. Therefore, it is difficult to operate the notebook PC 1 in such an environment.

Accordingly, Japanese Unexamined Patent Application Publication No. 2001-67145, for example, discloses a method for illuminating an operation unit by disposing an optical waveguide device at the lower side of a liquid crystal display to guide a part of backlight toward the operation unit.

According to the above-described publication, the optical waveguide device is placed near the operation unit at the lower side of the liquid crystal display. Thus, the optical waveguide device obstructs the movement of the user when the user operates the operation unit. In addition, light emitted from the optical waveguide device tends to enter the user's eyes directly. Therefore, the operability of the operation unit is degraded.

In addition, it is difficult to uniformly illuminate the operation unit by the light emitted from the optical waveguide device.

SUMMARY OF THE INVENTION

Accordingly, in view of the above-described situation, an object of the present invention is to provide an information processing apparatus in which an operation unit is uniformly illuminated by using backlight without degrading the operability of the operation unit.

According to a first aspect of the present invention, an information processing apparatus includes a main body having an operation unit and a display unit having a display panel for displaying information, a light source disposed at the lower side of the display panel, an optical waveguide which guides light emitted from the light source upward, and a reflective plate which is disposed at the upper side of the display panel and which reflects a part of the light guided by the optical waveguide, and the reflective plate reflects the part of the light guided by the optical waveguide to illuminate the operation unit.

The information processing apparatus may further include a reflective-plate hinge which retains the reflective plate such that the reflective plate can pivot.

In addition, the reflective plate may reflect the part of the light guided by the optical waveguide toward the display panel depending on the angle of the reflective-plate hinge. In such a case, the display panel reflects the light incident on the display panel to illuminate the operation unit.

In addition, the display panel may be a liquid crystal panel, and is illuminated by the light guided by the optical waveguide.

In the information processing apparatus according to the first aspect of the present invention, the light emitted from the light source disposed at the lower side of the display panel is guided upward by the optical waveguide, and the reflective plate reflects a part of the light and thereby illuminates the operation unit. Accordingly, the operation unit can be uniformly illuminated without degrading the operability.

According to a second aspect of the present invention, an information processing apparatus includes a main body having an operation unit and a display unit having a display panel for displaying information, a light source disposed at the upper side of the display panel, a reflective plate which reflects light emitted from the light source, an optical waveguide which guides the light emitted from the light source downward, and the reflective plate reflects the light emitted form the light source to illuminate the operation unit.

Also in this case, the information processing apparatus may further include a reflective-plate hinge which retains the reflective plate such that the reflective plate can pivot.

In addition, the reflective plate may reflect the light emitted from the light source toward the display panel depending on the angle of the reflective-plate hinge. IN such a case, the display panel reflects the light incident on the display panel to illuminate the operation unit.

In addition, the display panel may be a liquid crystal panel, and is illuminated by the light guided by the optical waveguide.

In the information processing apparatus according to the second aspect of the present invention, the reflective plate reflects the light emitted from the light source disposed at the upper side of the display panel and thereby illuminates the operation unit. Accordingly, the operation unit can be uniformly illuminated without degrading the operability.

DESCRIPTION OF THE PREFERRED EMBODIMENT

An embodiment of the present invention will be described below with reference to the accompanying drawings.

Figure 1:
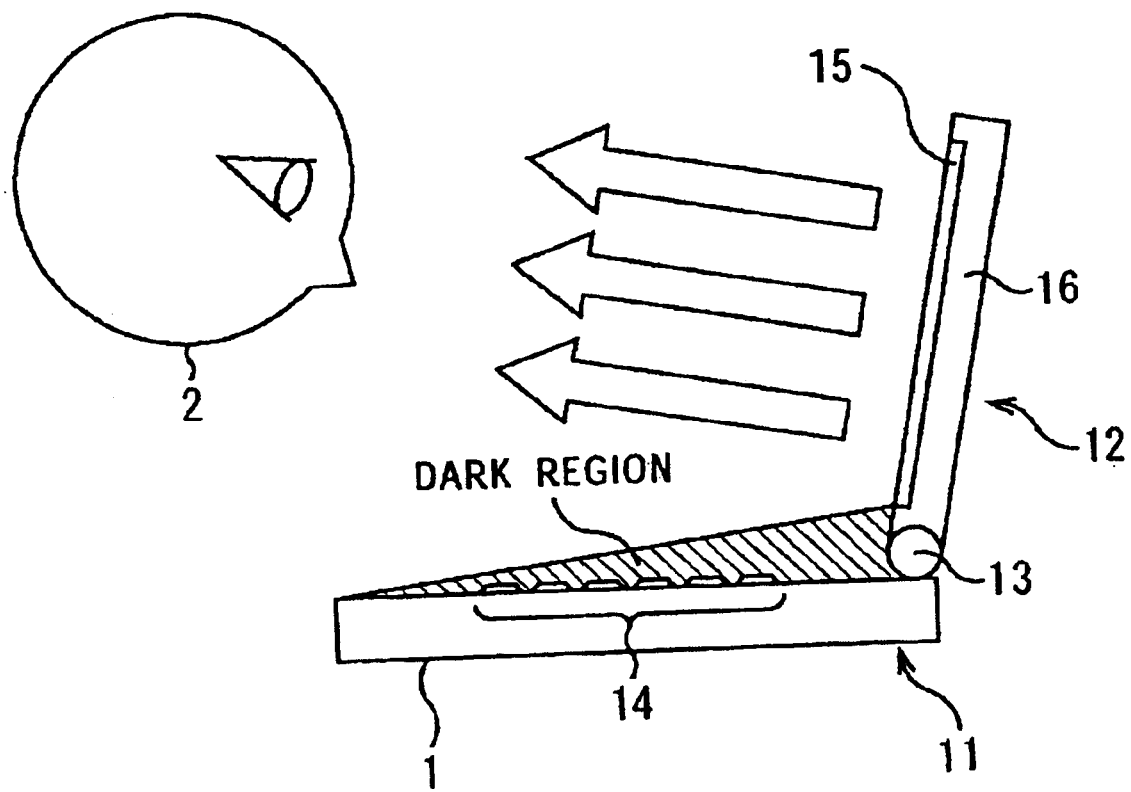
FIG. 1 is a diagram showing the external view of a known notebook PC.
Figure 2:
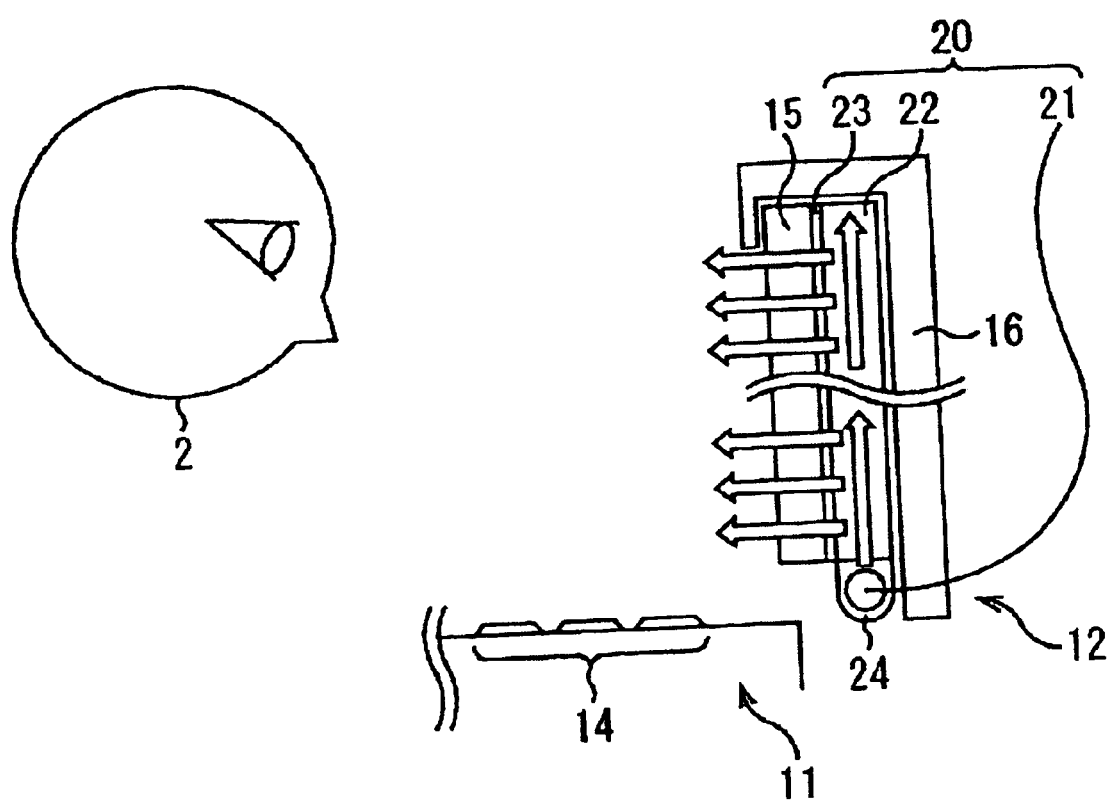
FIG. 2 is an enlarged sectional view of a part of the notebook PC shown in FIG. 1.
Figure 3:
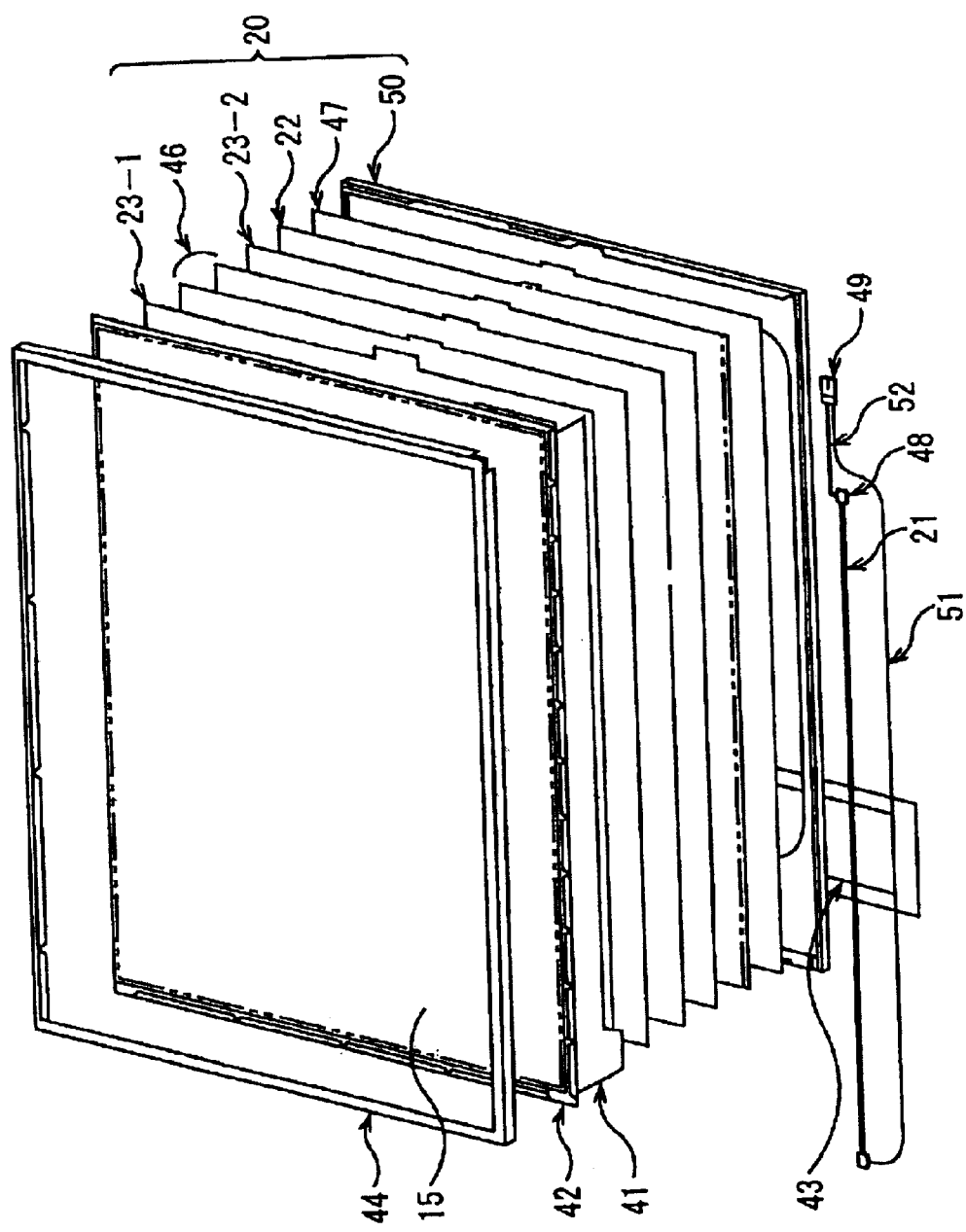
FIG. 3 is an exploded perspective view of a liquid crystal display module.

First, the construction of a thin film transistor (TFT) liquid crystal display module (LCM) used in the embodiment of the present invention will be described below with reference to FIGS. 3 and 4. FIG. 3 is an exploded perspective view of the liquid crystal display module, and FIG. 4 is a sectional view of a part of the liquid crystal display module.

The liquid crystal display module includes a metal frame (upper housing) 44, a liquid crystal panel 15, and a backlight unit 20.

Figure 4:
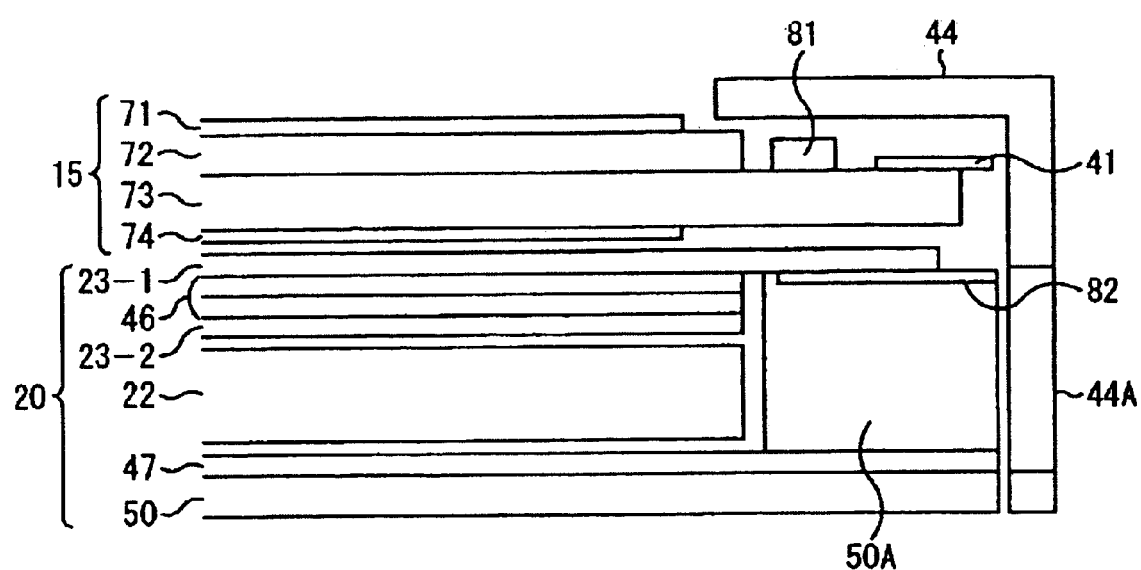
FIG. 4 is a sectional view of a part of the liquid crystal display module.

With reference to FIG. 4, the liquid crystal panel 15 includes a glass substrate 72 which serves as a TFT substrate with pixel electrodes, TFTs, etc., and a glass substrate 73 which serves as a TFT substrate with counter electrodes, color filters, etc. The glass substrates 72 and 73 are laminated with a predetermined gap therebetween and are bonded together with a frame-shaped sealing member (not shown) disposed between the glass substrates 72 and 73 at the peripheral region thereof. Liquid crystal is injected into the space surrounded by the glass substrates 72 and 73 and the sealing member through a liquid-crystal inlet formed in the sealing member. In addition, polarizing plates 71 and 74 are laminated on the glass substrates 72 and 73, respectively, at the external sides of the glass substrates 72 and 73.

A semiconductor integrated circuit (IC) 81 including a plurality of drain drivers and gate drives is mounted on the glass substrate 73. The drain drivers receive a driving power, display data, and control signals via a flexible printed substrate 41, and the gate drivers receive a driving power and control signals via a flexible printed substrate 42.

The flexible printed substrates 41 and 42 are connected to a drive-circuit substrate 43 which is disposed behind the backlight unit 20.

Figure 6:
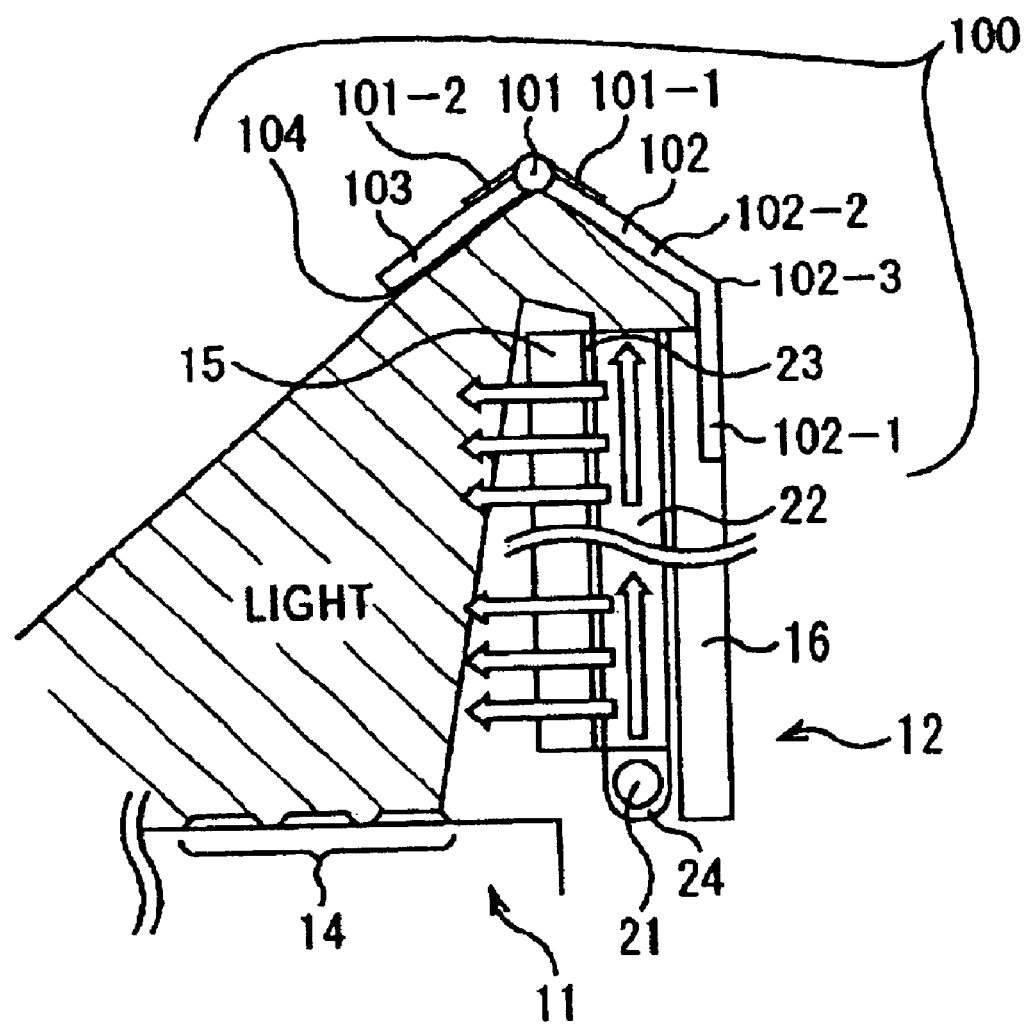
FIG. 6 is a sectional view of the notebook PC shown in FIG. 5 cut along line VI—VI.

With reference to FIG. 4, the semiconductor IC 81 is mounted at the upper side of the liquid crystal panel 15 (the upper side in the state in which a display unit 12 is open as shown in FIG. 6). However, it may of course be mounted at the lower side of the liquid crystal panel 15. In addition, although the semiconductor IC 81 is directly mounted on the glass substrate 73, it may also be mounted by using a tape carrier package (TCP).

The liquid crystal panel 15 including the drain drivers and the gate drives is disposed between a frame 44 having a display window and the backlight unit 20. The display window of the frame 44 defines the display region of the liquid crystal display module, and the region excluding the display region, that is, the region of the frame 44 which surrounds the display window is generally referred to as a display frame.

The backlight unit 20 includes a diffusion sheet 23-1, a lens sheet 46, a diffusion sheet 23-2, an optical waveguide 22 having a wedge shape (a trapezoidal shape when viewed from the side), a reflective sheet 47, and a cold-cathode fluorescent lamp 21, all of which are fitted, in the order shown in FIG. 3, inside a frame-shaped mold 50 having a side wall.

As shown in FIG. 4, an opening 50A is formed in the side wall of the mold 50, and an opening 44A is formed in the frame 44 at a position such that the opening 44A opposes the opening 50A. The cold-cathode fluorescent lamp 21 is disposed at the side opposite to the opening 50A of the mold 50 and the opening 44A of the frame 44 (the lower side in the state in which the display unit 12 is open as shown in FIG. 6).

Accordingly, as described below, a part of light emitted from the cold-cathode fluorescent lamp 21 travels through the optical waveguide 22, is emitted from the optical waveguide 22, and is guided through the opening 50A of the mold 50 and the opening 44A of the frame 44.

In addition, a reflector 82 is laminated on the back surface of the diffusion sheet 23-1, so that light loss at the top of the opening 44A of the frame 44 can be prevented.

One end of the cold-cathode fluorescent lamp 21 is connected to one end of a connector 49 by a cable 51, and the other end of the cold-cathode fluorescent lamp 21 is connected to the other end of the connector 49 by a rubber bush 48 and a cable 52. The connector 49 is connected to a driving unit (not shown), and supplies electrical power to the cold-cathode fluorescent lamp 21.

Figure 5:
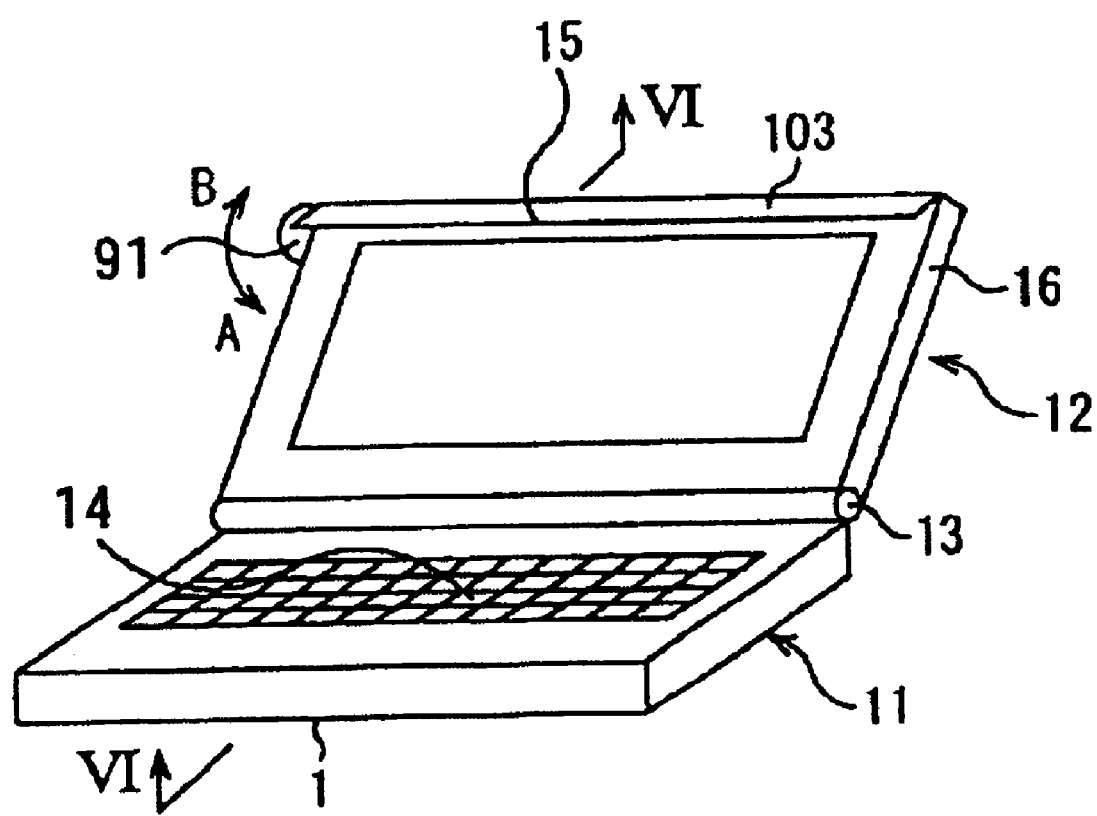
FIG. 5 is an external perspective view of a notebook PC according to an embodiment of the present invention.
Figure 7:
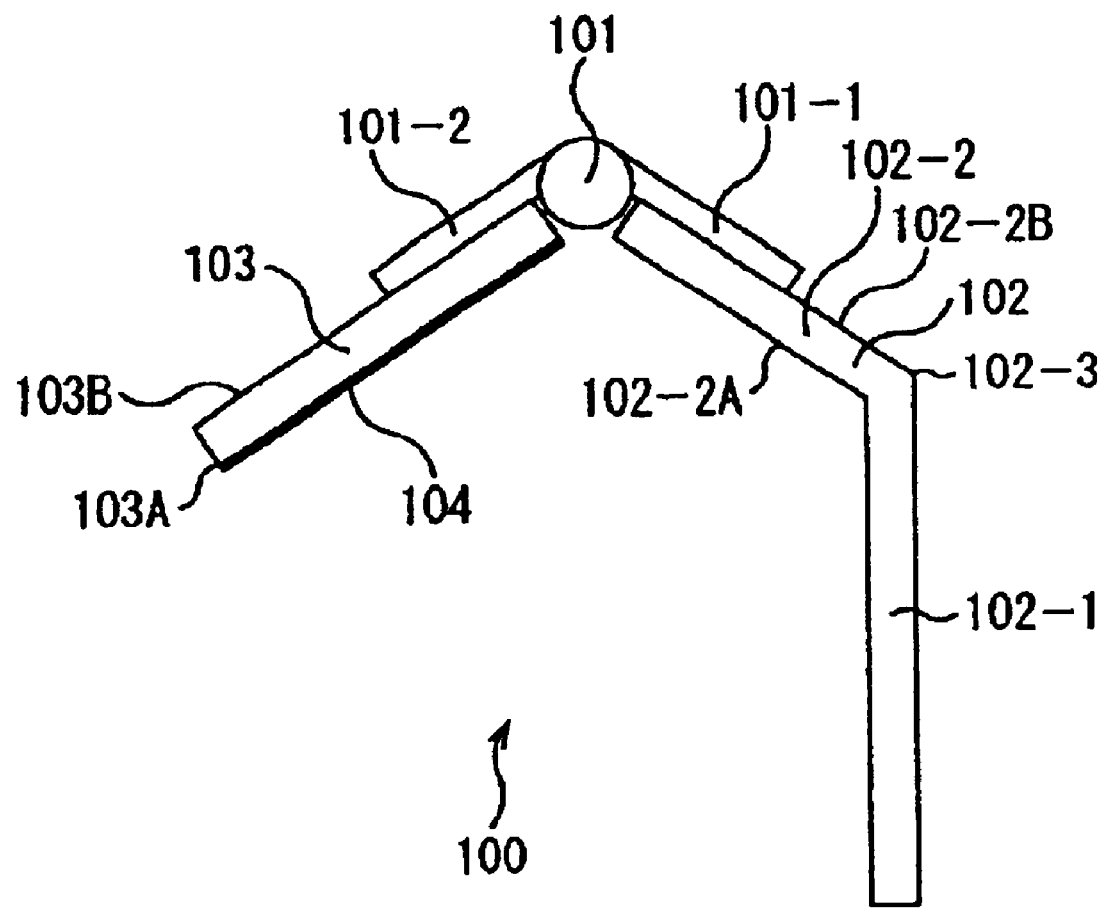
FIG. 7 is an enlarged view of a part of FIG. 6 including an illuminating unit.
Figure 8:
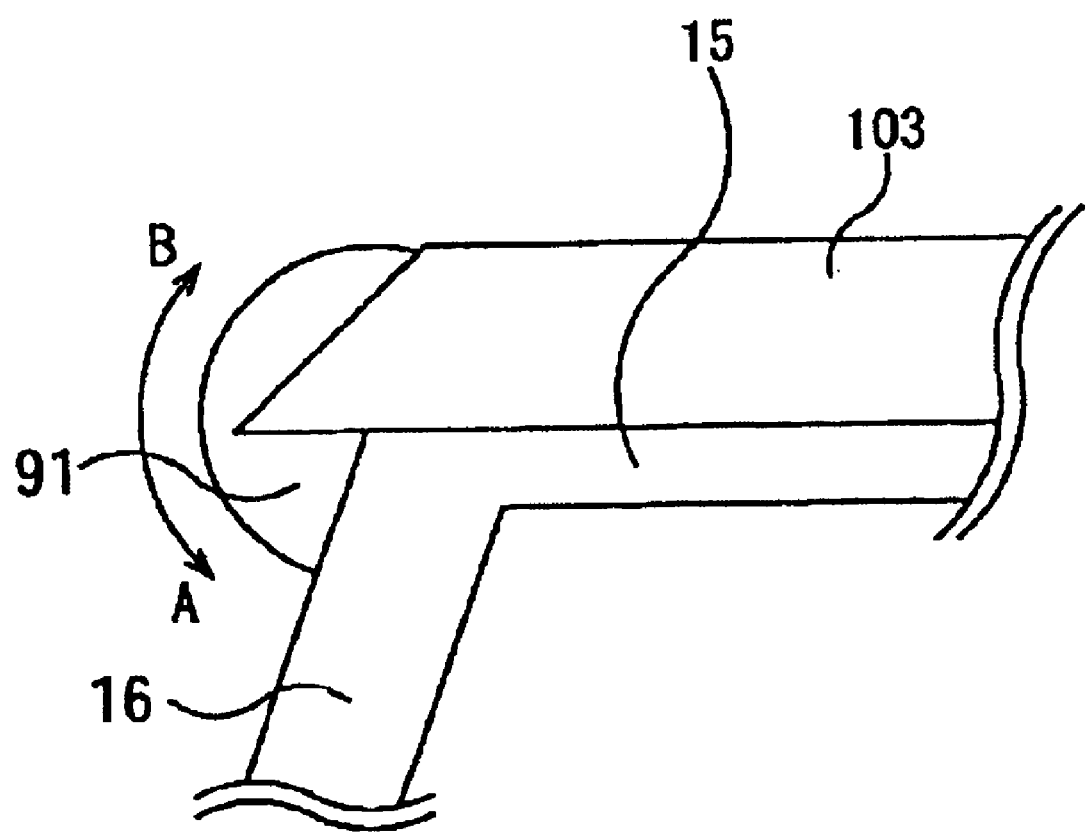
FIG. 8 is an enlarged view of a part of FIG. 5 including a dial and a reflective plate.

FIGS. 5 to 8 are diagrams showing the construction of a notebook PC 1 according to the embodiment of the present invention. FIG. 5 is an external perspective view of the notebook PC 1 showing the state in which the display unit 12 is opened by rotating it away from the main body 11, and FIG. 6 is a sectional view of the notebook PC 1 shown in FIG. 5 cut along line VI—VI. In addition, FIG. 7 is an enlarged view of a part of FIG. 6 including an illuminating unit 100, and FIG. 8 is an enlarged view of a part of FIG. 5 including a dial 91 and a reflective plate 103 provided on the display unit 12. Components similar to those included in the known notebook PC are denoted by the same reference numerals, and explanations thereof are omitted.

The display unit 12 includes the liquid crystal display module which is described above with reference to FIGS. 3 and 4. In addition, the display unit 12 further includes the illuminating unit 100 for guiding the light emitted from the optical waveguide 22 toward the desired direction, as described below. The illumination region 100 includes a reflective-plate hinge 101, a reflective plate unit 102, a reflective plate 103, and a diffusion plate 104.

The reflective-plate hinge 101 includes reflective-plate hinge members 101-1 and 101-2. The reflective plate unit 102 is connected to the reflective-plate hinge member 101-1, and the reflective plate 103 is pivotally connected to the reflective-plate hinge member 101-2.

The reflective plate unit 102 includes reflective plates 102-1 and 102-2 which are continuous with each other and which form a predetermined angle at a bent portion 102-3 positioned between them. The reflective plate 102-1 is fixed to an external frame 16, and a surface 102-2B of the reflective plate 102-2 is bonded to the reflective-plate hinge member 101-1. More specifically, the reflective plate unit 102 is formed separately from the external frame 16, and is fixed to the external frame 16 by bonding the reflective plate 102-1 to the external frame 16 with an adhesive or by other means.

When the reflective plate unit 102 is connected to the reflective-plate hinge 101 and is fixed to the external frame 16, the reflective plate 102-1 extends approximately vertically in FIGS. 6 and 7, and the reflective plate 102-2 faces downward at a predetermined angle at a position behind the reflective-plate hinge 101.

The reflective plate 103 is approximately flat, and a surface 103B of the reflective plate 103 is bonded to the reflective-plate hinge member 101-2. Accordingly, as shown in FIGS. 6 and 7, the reflective plate 103 faces downward at a predetermined angle at the display side of (at a position in front of) the reflective-plate hinge 101.

In addition, the diffusion plate 104 is bonded to a surface 103A of the reflective plate 103 which receives the light guided through the optical waveguide 22. The light guided through the optical waveguide 22 is incident on a surface 102-2A of the reflective plate 102-2, is reflected by the surface 102-2A, and is incident on the diffusion plate 104 bonded to the surface 103A of the reflective plate 103. Then, the light is effectively diffused by the diffusion plate 104, and uniformly illuminates the operation unit such as the keyboard 14. Instead of laminating the diffusion plate 104 on the surface 103A, the surface 103A itself may have the diffusion function.

With reference to FIG. 8, when the dial 91 is rotated in the direction shown by the arrow A, the reflective plate 103 is rotated toward the display unit 12 by the reflective-plate hinge 101 along with the rotation of the dial 91. In addition, when the dial 91 is rotated in the direction shown by the arrow B, the reflective plate 103 is rotated away from the display unit 12 by the reflective-plate hinge 101.

Figure 9A:
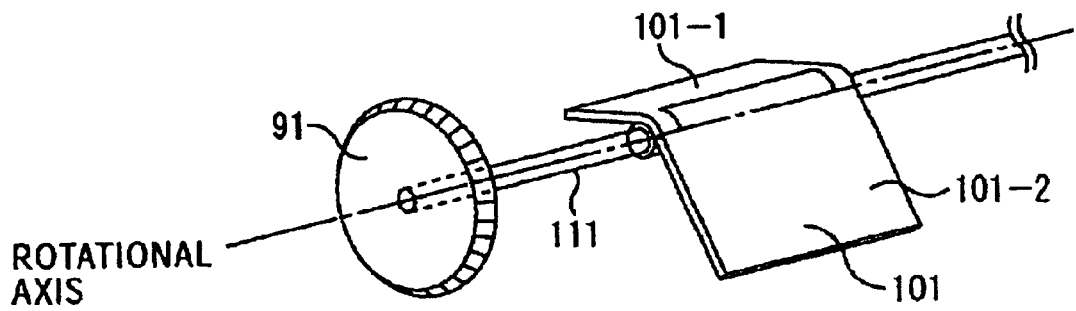
FIGS. 9A and 9B are diagrams showing the manner in which a reflective-plate hinge and the dial are attached to each other.
Figure 9B:
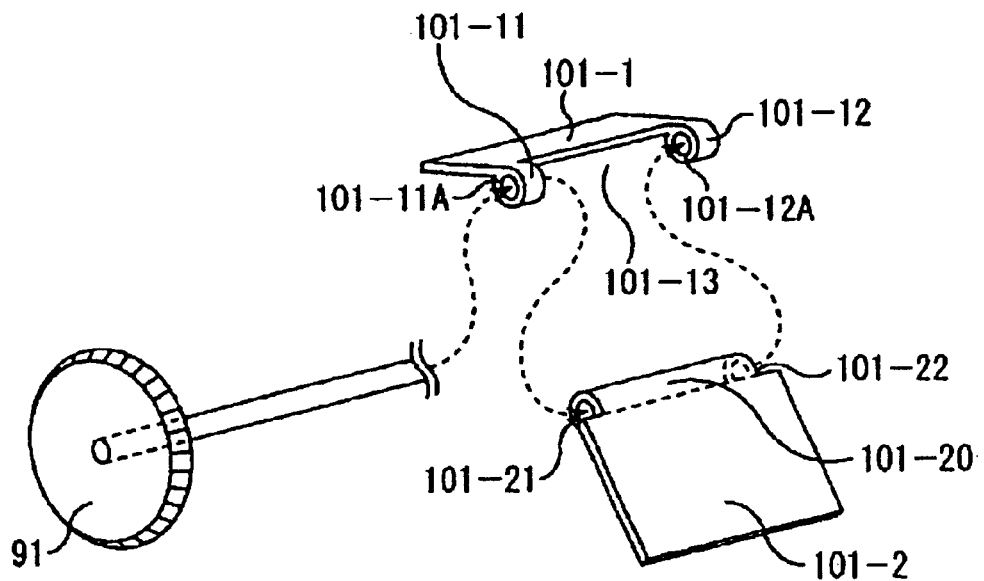

Next, the manner in which the reflective-plate hinge 101 and the dial 91 are attached to each other will be described with reference to FIGS. 9A and 9B. FIG. 9A is a diagram showing the manner in which the dial 91 and the reflective-plate hinge 101 are attached to each other with an axial rod 111, and FIG. 9B is an exploded perspective view of FIG. 9A.

The axial rod 111 is fixed to the dial 91, and the reflective-plate hinge 101 is constructed of the reflective-plate hinge members 101-1 and 101-2.

The reflective-plate hinge member 101-1 includes engaging portions 101-11 and 101-12 for engaging with the reflective-plate hinge member 101-2 and a groove 101-13. In addition, holes 101-11A and 101-12A are formed in the engaging portions 101-11 and 101-12, respectively.

The reflective-plate hinge member 101-2 includes an engaging portion 101-20 for engaging with the reflective-plate hinge member 101-1, and holes 101-21 and 101-22 are formed in the engaging portion 101-20. In actuality, the holes 101-21 and 101-22 are continuous to each other and the engaging portion 101-20 has a tubular shape.

The engaging portion 101-20 of the reflective-plate hinge member 101-2 is fitted into the groove 101-13 of the reflective-plate hinge member 101-1, and the axial rod 111, which is fixed to the dial 91, is inserted through the hole 101-11A in the engaging portion 101-11 of the reflective-plate hinge member 101-1, the holes 101-21 and 101-22 in the engaging portion 101-20 of the reflective-plate hinge member 101-2, and the hole 101-12A in the engaging portion 101-12 of the reflective-plate hinge member 101-1.

The diameter of the holes 101-21 and 101-22 in the engaging portion 101-20 of the reflective-plate hinge member 101-2 is approximately the same as that of the axial rod 111 so that the axial rod 111 is closely fitted in the holes 101-21 and 101-22. In addition, an adhesive is applied to the inner surfaces of the holes 101-21 and 101-22, so that the axial rod 111 is fixed thereto. On the other hand, the diameter of the holes 101-11A and 101-12A in the engaging portions 101-11 and 101-12, respectively, of the reflective-plate hinge member 101-1 is slightly larger than that of the axial rod 111, so that the axial rod 111 is pivotally retained in the holes 101-11A and 101-12A.

Accordingly, when the dial 91 is rotated around the rotational axis in a predetermined direction (the direction shown by the arrow A or the direction shown by the arrow B in FIG. 8), only the reflective-plate hinge member 101-2 is rotated along with the rotation of the dial 91. Accordingly, as described below, the angle of the reflective plate 103, which is connected to the reflective-plate hinge member 101-2, can be set to a desired angle.

Next, an example of a manner in which the illuminating unit 100 is mounted will be described with reference to FIG. 10, which shows an external perspective view of the display unit 12.

Figure 10:
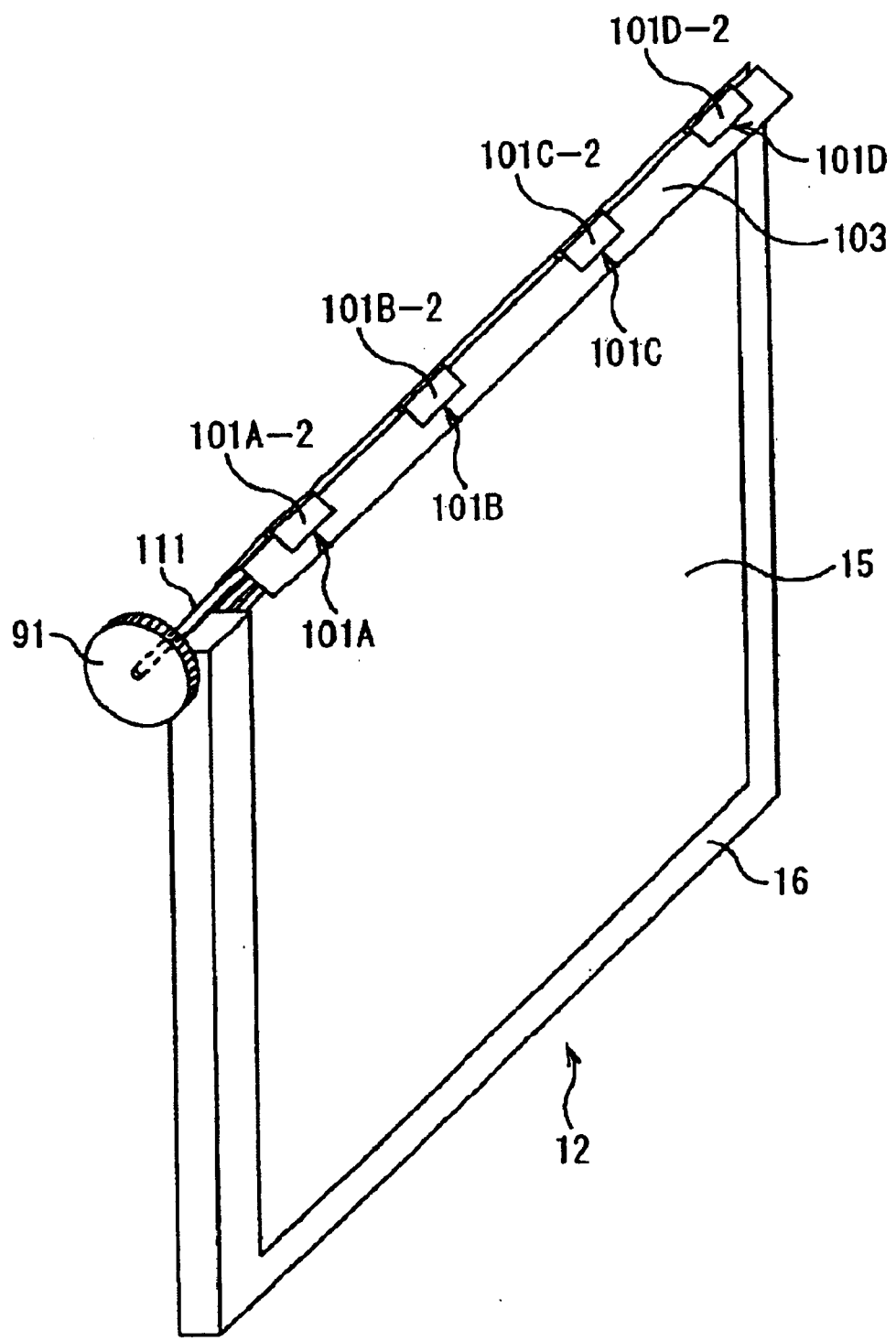
FIG. 10 is a diagram showing an example of a manner in which the illuminating unit is mounted.

As shown in FIG. 10, reflective-plate hinges 101A to 101D identical to the above-described reflective-plate hinge 101 are fixed to the axial rod 111, and the reflective plate 103 is connected to reflective-plate hinge members 101A-2 to 101D-2 of the reflective-plate hinges 101A to 101D, respectively. In addition, the reflective plate unit 102 is connected to reflective-plate hinge members 101A-1 to 101D-1 (not shown) of the reflective-plate hinges 101A to 101D, respectively, and is fixed to the external frame 16.

When the dial 91 is rotated in a predetermined direction, the reflective-plate hinge members 101A-2 to 101D-2 are also rotated along with the rotation of the dial 91, and the reflective plate 103, which is connected to the reflective-plate hinge members 101A-2 to 101D-2, is also rotated. More specifically, the reflective plate 103 is rotated along with the rotation of the dial 91, and the angle of the reflective plate 103 is adjusted to a desired angle.

Although four reflective-plate hinges are shown in FIG. 10, the number of the reflective-plate hinges is not limited.

Next, the manner in which the operation unit such as the keyboard 14 is illuminated by using the light emitted from the backlight unit 20 will be described below with reference to FIGS. 11A and 11B.

Figure 11A:
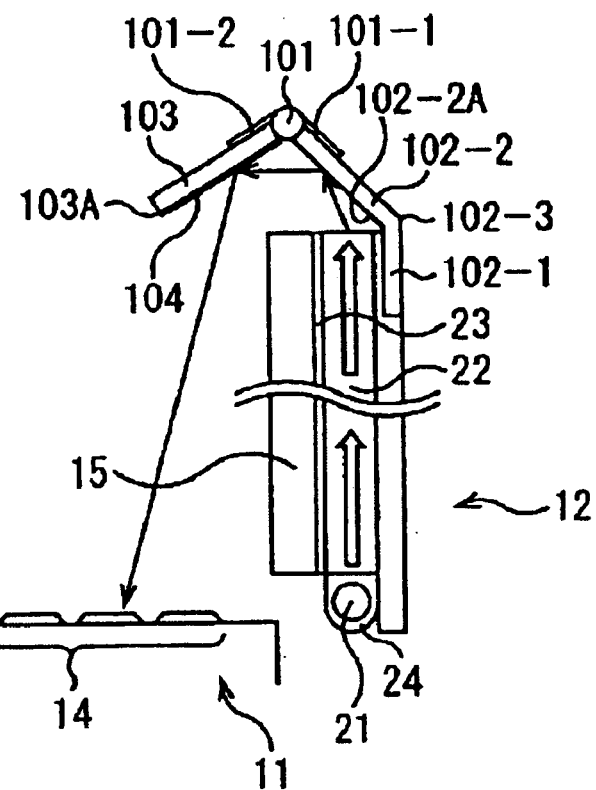
FIGS. 11A and 11B are diagrams showing the manner in which a keyboard is illuminated by using light from a backlight unit.

For example, the case is considered in which the user 2 rotates the dial 91 in the direction shown by the arrow B in FIG. 8 and sets the angle of the reflective-plate hinge member 101-2 and the reflective plate 103 as shown in FIG. 11A. In such a case, light emitted from the cold-cathode fluorescent lamp 21 is guided upward by the optical waveguide 22 and illuminates the entire surface of the liquid crystal panel 15. In addition, a part of the light is emitted upward through the opening 50A of the mold 50 and the opening 44A of the frame 44, and is incident on the surface 102-2A of the reflective plate 102-2, which is connected to the reflective-plate hinge member 101-1.

The light is reflected by the surface 102-2A, and is incident on the diffusion plate 104 bonded to the surface 103A of the reflective plate 103, which is connected to the reflective-plate hinge member 101-2. Then, the light is efficiently diffused by the diffusion plate 104, and uniformly illuminates the operation unit such as the keyboard 14.

Due to the nature of light, the incidence angle and the emission angle of the light which is incident on the surface 102-2A of the reflective plate 102-2 are the same.

As described above, the reflective plate unit 102 is fixed to the external frame 16, and the reflective plate 103 is pivotally connected to the reflective-plate hinge 101. Therefore, the user 2 can change the angle of the reflective plate 103 by rotating the dial 91 in accordance with the situation (for example, a situation where the display unit 12 is inclined toward the keyboard 14 so as to avoid the reflection of external light on the liquid crystal panel 15 of the display unit 12, a situation where the posture of the user 2 who operates the notebook PC 1 is different, etc.). Accordingly, the operation unit such as the keyboard 14 can be reliably illuminated.

Figure 11B:
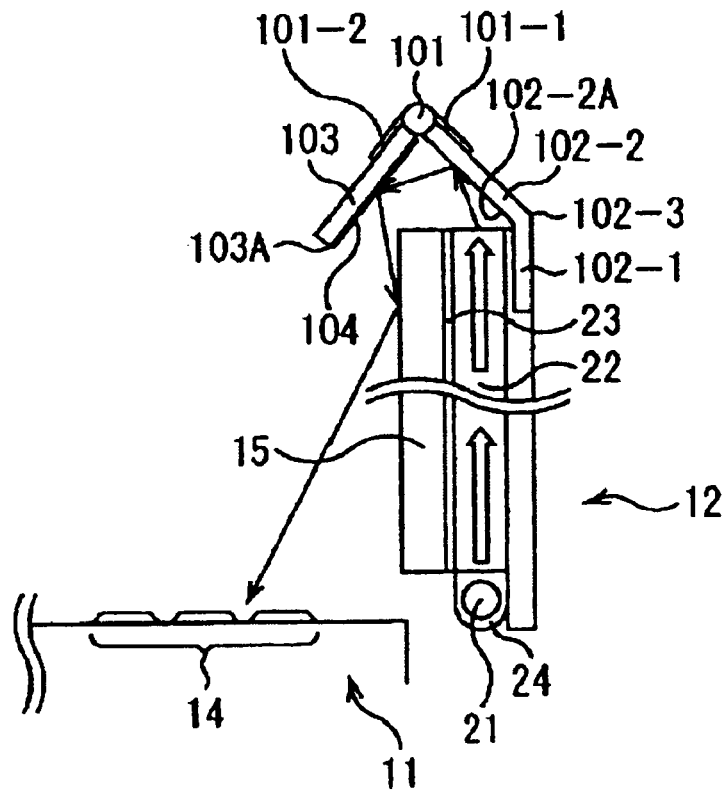

Next, the case is considered in which the user 2 rotates the dial 91 in the direction shown by the arrow A in FIG. 8 and sets the angle of the reflective-plate hinge member 101-2 and the reflective plate 103 as shown in FIG. 11B. Also in this case, as described above with reference to FIG. 11A, the light emitted from the cold-cathode fluorescent lamp 21 is guided upward by the optical waveguide 22 and illuminates the entire surface of the liquid crystal panel 15. In addition, a part of the light is emitted upward through the opening 50A of the mold 50 and the opening 44A of the frame 44, and is incident on the surface 102-2A of the reflective plate 102-2, which is connected to the reflective-plate hinge member 101-1.

The light is reflected by the surface 102-2A, is incident on the diffusion plate 104 bonded to the surface 103A of the reflective plate 103, which is connected to the reflective-plate hinge member 101-2, is diffused by the diffusion plate 104, and is incident on the liquid crystal panel 15. Then, the light is reflected by the liquid crystal panel 15, and uniformly illuminates the operation unit such as the keyboard 14.

Accordingly, the light diffused by the diffusion plate 104 bonded to the surface 103A of the reflective plate 103 may be incident on the liquid crystal panel 15 depending on the angle of the reflective plate 103. In such a case, the light is reflected by the liquid crystal panel 15, and then illuminates the operation unit such as the keyboard 14. Since the light reflected by the liquid crystal panel 15 is incident on the operation unit at a large incidence angle, it does not enter the eyes of the user 2.

Accordingly, in the illumination unit 100, the light emitted from the backlight unit 20 can be guided toward the desired direction and the operation unit can be easily illuminated irrespective of the angle of the reflective plate 103.

Although the cold-cathode fluorescent lamp 21 is disposed at the lower side of the liquid crystal panel 15 in the above-described example (the lower side in the state in which the display unit 12 is open as shown in FIG. 6), it may also be disposed at the upper side of the liquid crystal panel 15.

Figure 12:
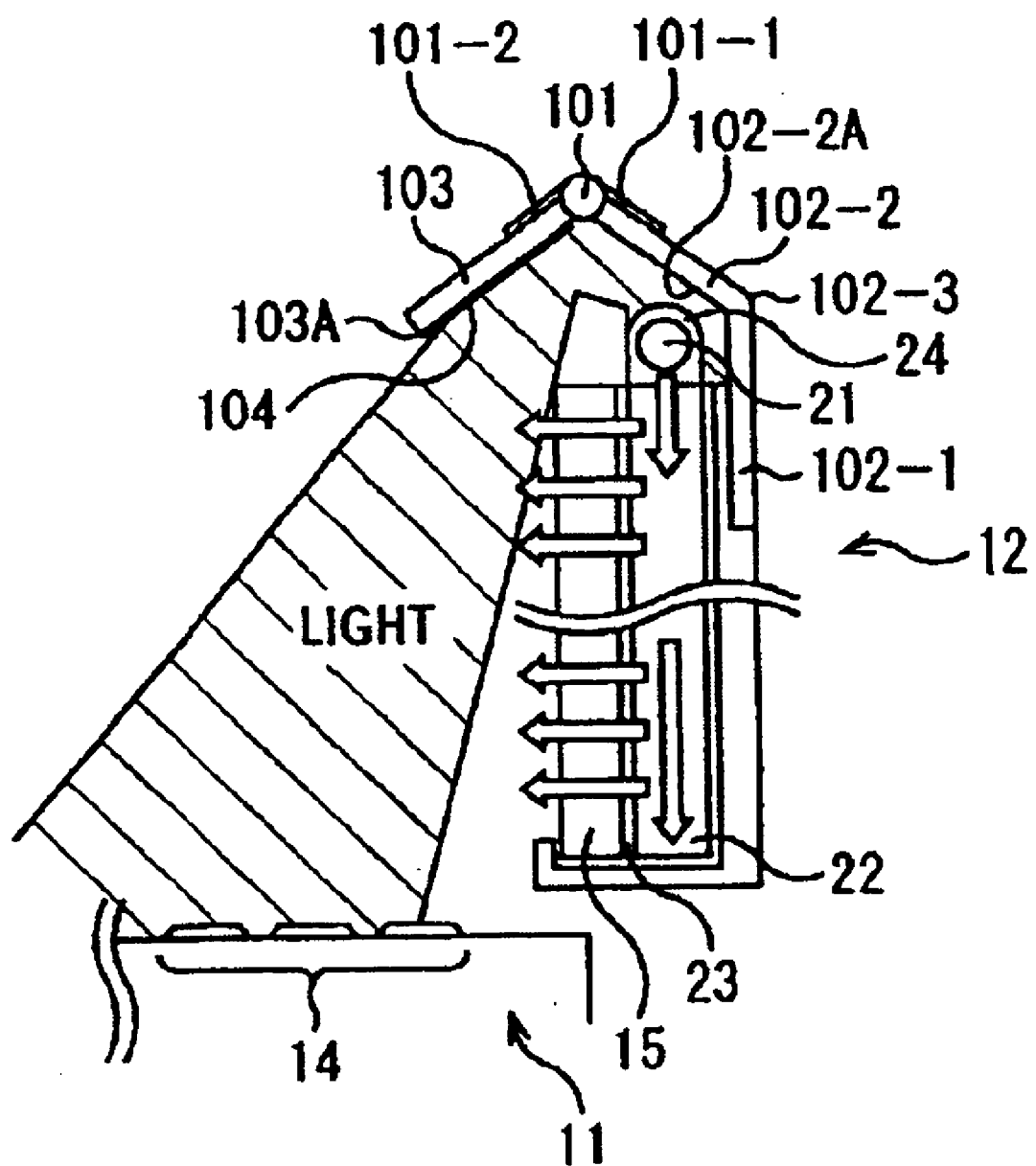
FIG. 12 is a diagram showing an example of a construction in which a cold-cathode fluorescent lamp is disposed at the upper side of a liquid crystal panel.

FIG. 12 is a diagram showing an example of a construction in which the cold-cathode fluorescent lamp 21 is disposed at the upper side of the liquid crystal panel 15. The construction shown in FIG. 12 is similar to that shown in FIG. 6 except that the cold-cathode fluorescent lamp 21 is disposed at the upper side of the liquid crystal panel 15, and explanations thereof are thus omitted.

Light emitted from the cold-cathode fluorescent lamp 21 disposed at the upper side of the liquid crystal panel 15 is guided downward by the optical waveguide 22, and illuminates the entire surface of the liquid crystal panel 15. In addition, the light which passes through the reflector 24 is incident on the surface 102-2A of the reflective plate 102-2, which is connected to the reflective-plate hinge member 101-1.

The light is reflected by the surface 102-2A, and is incident on the diffusion plate 104 bonded to the surface 103A of the reflective plate 103, which is connected to the reflective-plate hinge member 101-2. Then, the light is efficiently diffused by the diffusion plate 104, and uniformly illuminates the operation unit such as the keyboard 14.

Figure 13:
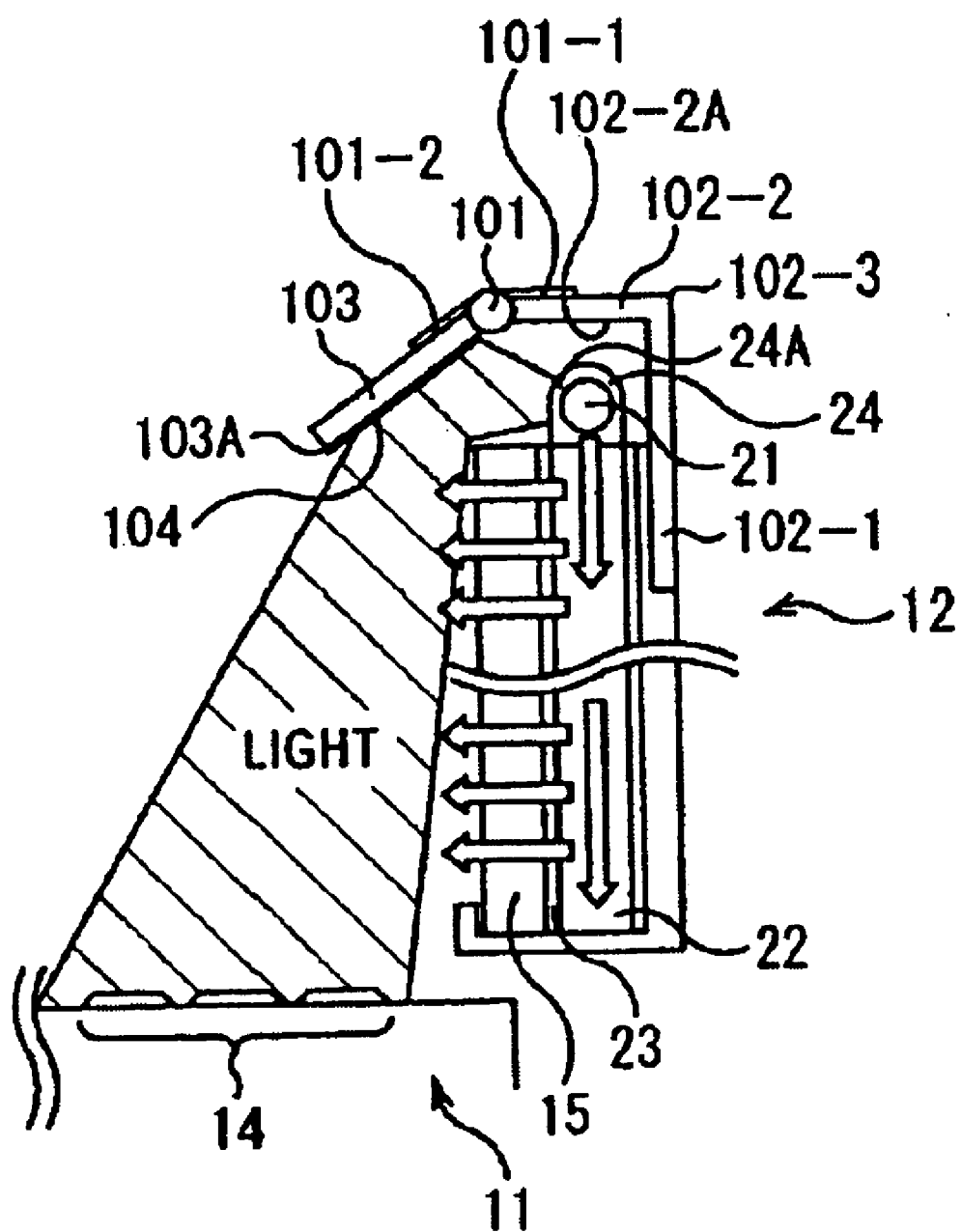
FIG. 13 is a diagram showing another example of a construction in which the cold-cathode fluorescent lamp is disposed at the upper side of the liquid crystal panel.

FIG. 13 is a diagram showing another example of a construction in which the cold-cathode fluorescent lamp 21 is disposed at the upper side of the liquid crystal panel 15. As shown in FIG. 13, reflective plates 102-1 and 102-2 form a right angle at a bent portion 102-3 positioned between them, and an opening 24A is formed in the reflector 24, which surrounds the cold-cathode fluorescent lamp 21, such that the opening 24A faces the reflective plate 103.

A part of light from the cold-cathode fluorescent lamp 21, which is disposed at the upper side of the liquid crystal panel 15, is emitted through the opening 24A in the reflector 24, and is incident on the surface 102-2A of the reflective plate 102-2, which is connected to the reflective-plate hinge member 101-1. Then, the light is reflected by the surface 102-2A, and is incident on the diffusion plate 104 bonded to the surface 103A of the reflective plate 103, which is connected to the reflective-plate hinge member 101-2. Then, the light is efficiently diffused by the diffusion plate 104, and uniformly illuminates the operation unit such as the keyboard 14.

Accordingly, in both cases where the cold-cathode fluorescent lamp 21 is disposed at the upper side and the lower side of the liquid crystal panel 15, the illuminating unit 100 efficiently illuminates the operation unit such as the keyboard 14.

The opening 24A is formed in the reflector 24 shown in FIG. 13 in order to efficiently emit the light from the cold-cathode fluorescent lamp 21 toward the reflective plate 103. Similarly, the opening 24A may also be formed in the reflector 24 shown in FIG. 12, so that the illuminating light from the cold-cathode fluorescent lamp 21 can be efficiently emitted.

When the constructions shown in FIGS. 12 and 13 are used, it is not necessary to form the openings 50A and 44A in the mold 50 and the frame 44, respectively.

In addition, although the reflective plate unit 102 is formed separately from the external frame 16, it may also be formed integrally with the external frame 16.

Figure 14:
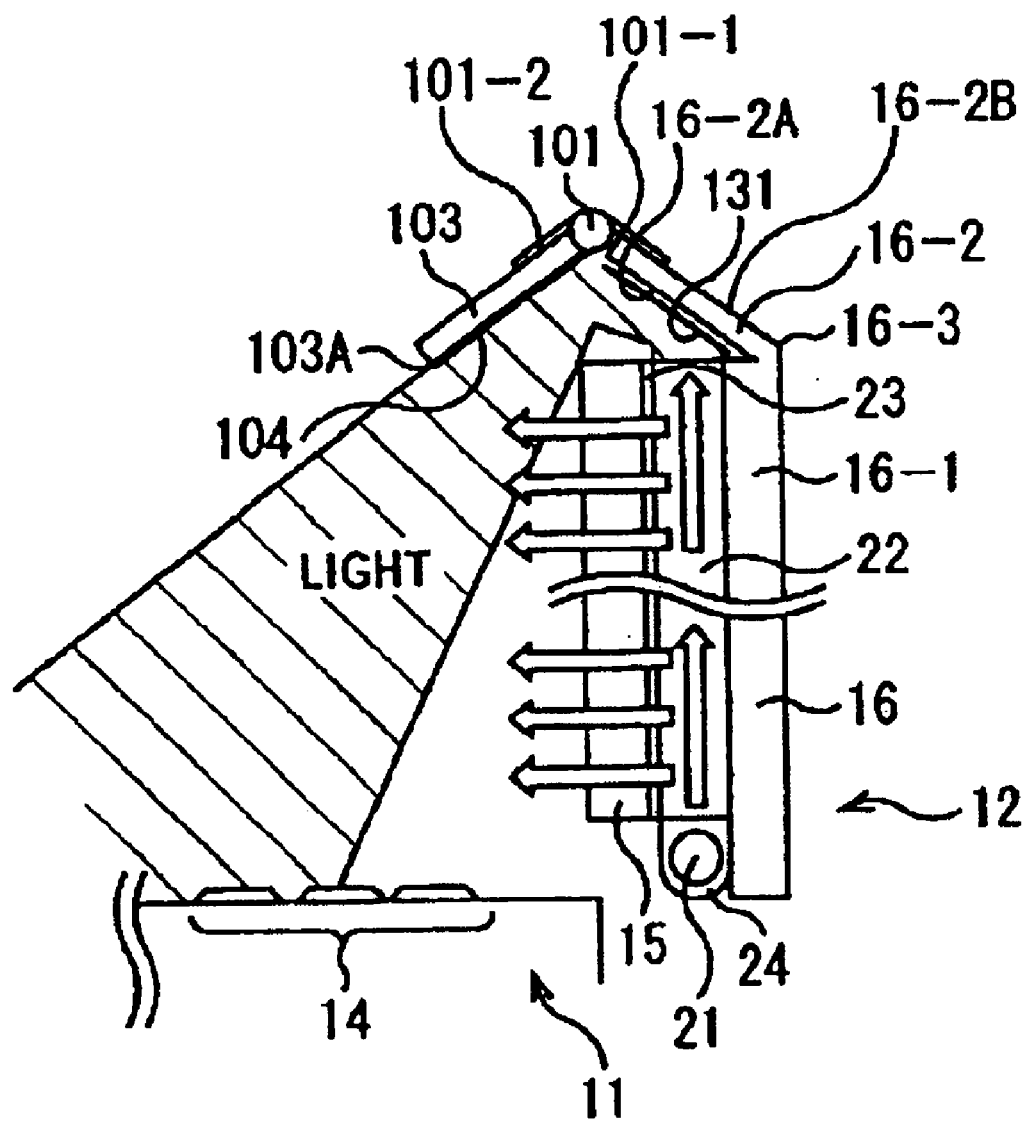
FIG. 14 is a diagram showing an example in which a part of a frame serves as a part of the illuminating unit.

FIG. 14 is a diagram showing the construction in which the reflective plate unit 102 is formed integrally with the external frame 16. The external frame 16 includes external frame members 16-1 and 16-2 which form a predetermined angle at a bent portion 16-3 positioned between them. A surface 16-2B of the external frame member 16-2 is connected to the reflective-plate hinge member 101-1, and a reflective plate 131 is bonded to a surface 16-2A of the external frame member 16-2. Accordingly, a construction similar to the one shown in FIG. 6 is obtained.

Figure 15A:
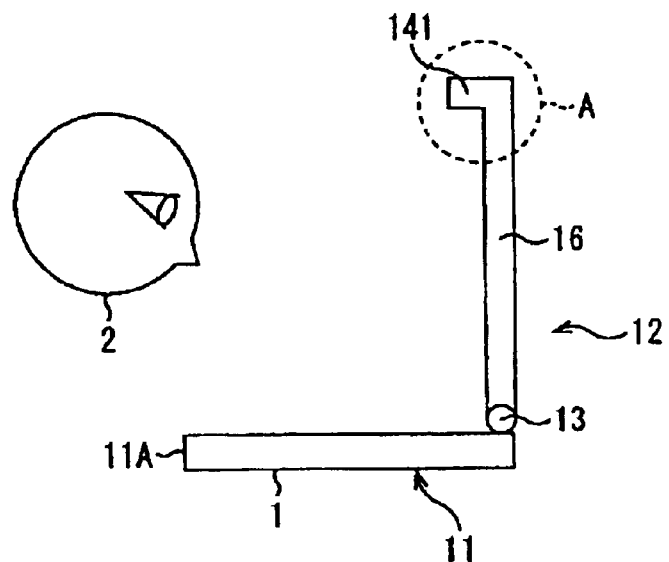
FIGS. 15A to 15C are diagrams for explaining an illuminating-unit container.
Figure 15B:
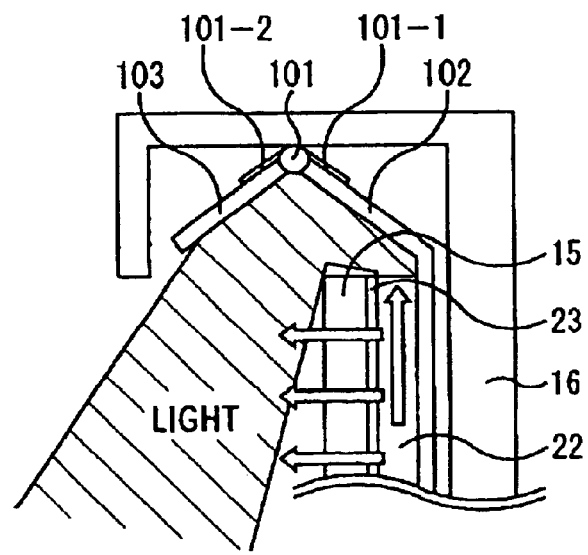
Figure 15C:
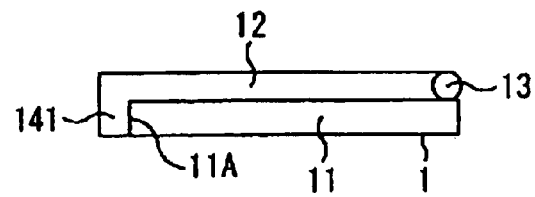

As shown in FIGS. 15A to 15C, the illuminating unit 100 may be installed such that it does not overlap in the thickness direction of the notebook PC 1 when the display unit 12 is closed. FIG. 15A is a diagram showing the state in which the display unit 12 of the notebook PC 1 is open. In addition, FIG. 15B is an enlarged sectional view of a part of FIG. 15A which is denoted by A, and FIG. 15C is a diagram showing the state in which the notebook PC 1 is closed.

An illuminating-unit container 141 for storing the illuminating unit 100 is formed at the upper side of the display unit 12 such that the illuminating unit container 141 comes into contact with a surface 11A of the main body 11 when the display unit 12 is closed (see FIG. 15C). More specifically, the size of the display unit 12 in the vertical direction in FIG. 15A is larger than that of the main body 11 so that the thickness of the notebook PC 1 does not increase, and the illuminating-unit container 141 for storing the illumination region 100 is disposed at the top edge of the display unit 12.

Accordingly, the illuminating unit 100 can be installed without increasing the thickness of the notebook PC 1 in the state in which the notebook PC 1 is closed.

Since the illuminating unit 100 is disposed at the upper side of the display unit 12, the operation unit such as the keyboard 14 can be illuminated without degrading the operability thereof. In addition, since the reflective plate 103 is pivotally retained by the reflective-plate hinge 101, the user 2 can adjust the angle of the reflective plate 103 to the desired angle and guide the illuminating light from the backlight unit 20 toward the desired direction in accordance with the environment in which the user 2 uses the notebook PC 1.

What is claimed is:

1. An information processing apparatus comprising:
   a main body including an operation unit; and
   a display unit including a display panel for displaying information, a light source disposed at the upper side of the display panel, a reflective plate which reflects light emitted from the light source, an optical waveguide which guides the light emitted from the light source downward,
   wherein the reflective plate reflects the light emitted from the light source to illuminate the operation unit.

2. An information processing apparatus according to claim 1, further comprising a reflective-plate hinge which retains the reflective plate such that the reflective plate can pivot.

3. An information processing apparatus according to claim 2, wherein the reflective plate reflects the light emitted from the light source toward the display panel depending on the angle of the reflective-plate hinge, and the display panel reflects the light incident on the display panel to illuminate the operation unit.

4. An information processing apparatus according to claim 1, wherein the display panel is a liquid crystal panel, and is illuminated by the light guided by the optical waveguide.

* * * * *